United States Patent [19]

Pilla

[11] 4,178,389
[45] Dec. 11, 1979

[54] ALCOHOLIC BEVERAGE MAKING COMPOSITION AND PROCESS

[76] Inventor: Donald P. Pilla, 648 Cedar Ave., Burlington, Ontario, Canada

[21] Appl. No.: 890,932

[22] Filed: Mar. 28, 1978

[30] Foreign Application Priority Data

May 27, 1977 [CA] Canada .................................. 279366

[51] Int. Cl.² ........................... C12C 5/00; C12C 5/04
[52] U.S. Cl. ....................................... 426/11; 426/15; 426/62; 426/592; 426/250; 426/540
[58] Field of Search .................... 426/11, 15, 62, 592, 426/250, 540

[56] References Cited

U.S. PATENT DOCUMENTS

| | | | |
|---|---|---|---|
| 3,598,607 | 8/1971 | Morse | 426/11 |
| 3,798,331 | 3/1974 | Bavisotto | 426/11 |

FOREIGN PATENT DOCUMENTS

| | | |
|---|---|---|
| 6089 of 1882 | United Kingdom | 426/11 |
| 5883 of 1885 | United Kingdom | 426/11 |
| 9165 of 1893 | United Kingdom | 426/11 |
| 1492992 11/1977 | United Kingdom | 426/15 |

*Primary Examiner*—Jeanette M. Hunter
*Attorney, Agent, or Firm*—Hirons, Rogers & Scott

[57] ABSTRACT

An alcoholic beverage of good clarity and alcohol content in the 12–16% by volume range, namely wine or cider, is made in a space of about 28 days by mixing together water, sugar and a rapid ferment and flavor conferring composition, maintaining the mixture under fermentation conditions for about 28 days, and then removing the liquor from the solid sediment. The composition comprises a mixture of, firstly, the dried granulated product prepared by mixing the yeast nutrients ammonium phosphate, urea, monobasic potassium phosphate and tricalcium phosphate with water to form a paste, then drying and granulating the solid mixture from the paste; and, secondly, a combination of flavor conferring and fermentation ingredients including a wine yeast, food grade lecithin, calcium carbonate, sodium citrate and an organic acid such as malic acid. For a wine beverage, freeze-dried wine powder may be added. For a cider beverage, apple juice powder is added.

8 Claims, No Drawings

ALCOHOLIC BEVERAGE MAKING COMPOSITION AND PROCESS

FIELD OF THE INVENTION

This invention relates to wine-making processes and ingredients therefor. More particularly, it relates to a combination of ingredients which can be used domestically, to prepare alcoholic beverages in very short spaces of time.

BACKGROUND OF THE INVENTION

Home winemaking has achieved a considerable degree of popularity as a hobby, both in Western Europe and in North America. Its appeal, however, tends to be limited to ardent hobbyists, because of a number of factors. The principal ones of such factors are probably time and trouble. With standard techniques and normal ingredients, it is unusual to be able to make a satisfactory table wine in less than about one year. Moreover, the procedures involved are often time-consuming and inconvenient. They include extraction of juices and flavors from fruits and flowers, preparation of a must, sterilizing, acidity testing, primary fermentation, secondary fermentation, gradual sugar addition, racking, bottling, specific gravity testing and so on, all done according to at least an approximate timetable or schedule. Home winemaking is simply too much trouble for many people.

SUMMARY OF THE INVENTION

The present invention provides a combination of selected ingredients, some of them specially prepared, which permits an alcoholic beverage having most if not all of the characteristics of a normal commercial grape wine, or optionally of a hard apple cider, to be prepared domestically in a period of 28 days. All that needs to be done is to mix thoroughly, with prescribed amounts of sugar and water, the combination of ingredients according to the invention, and allow the mixture to ferment under fermentation conditions generally protected from excessive exposures to the atmosphere. No special equipment is needed and no other procedural steps need to be taken, except finally to pour the alcoholic beverage so formed, from the fermentation sediment of expired yeasts, etc.

Thus according to one aspect of the present invention, there is provided a composition of matter suitable for preparing an alcoholic beverage on mixing with fermentable sugar and water and fermenting, said composition comprising:

(i) the dried granular product obtained by mixing with water to form a semi-solid, non-flowing paste a yeast nutrient combination comprising from about 3 to about 5 parts by weight of ammonium phosphate, from about 3 to about 5 parts by weight of urea, from about 1.5 to about 3.5 parts by weight monobasic potassium phosphate, and from about 0.5 to about 1.5 parts by weight tricalcium phosphate, drying the paste and granulating the dried product so formed; in admixture with (ii) a combination of flavor conferring and fermentation ingredients comprising from about 3 to about 5 parts by weight of food grade lecithin, from about 5 to about 7 parts by weight of calcium carbonate, from about 10 to about 15 parts by weight of wine yeast, from about 20 to about 25 parts by weight of sodium citrate, and from about 60 to about 75 parts by weight of a palatable organic acid selected from malic acid, succinic acid, tartaric acid and citric acid, the weight ratio of product (i) to ingredients combination (ii) being from about 1:16 to about 1:7.

According to another aspect of the invention, there is provided a process of making an alcoholic beverage which comprises mixing together a composition as hereinbefore defined, fermentable sugar in the amount of from about 1900 to about 3200 parts by weight, and water in the amount of from about 8000 to about 12000 parts by weight, maintaining the mixture under fermentation promoting conditions and permitting fermentation to proceed for a period of from about 20-32 days, and separating the liquid from substantial amounts of sediment formed during fermentation.

DESCRIPTION OF THE PREFERRED EMBODIMENTS

The term "wine" is correctly used only when applied to an alcoholic beverage produced by fermentation of grape juice. The ingredients according to the invention do not necessarily include grape juice, or indeed any other product derived from grapes. In a first preferred embodiment, however, there is included among the flavor-conferring ingredients a dried wine powder, so that the product made as a result of the fermentation in the first preferred embodiment is properly termed "wine". The dried wine powder is suitably manufactured by the freeze-drying or spray-drying of partially fermented grape juice, and is used in powder form. In the composition of the invention it is suitably used in an amount of from about 5% to about 10% by weight, based upon the total weight of other ingredients of the composition. It will normally be included among ingredients (ii). The use of such wine powder tends to enhance the viniferous flavor and other viniferous characteristics of the resulting beverage. Dried wine powders are commercially available. Specific suitable ones are, for making white wine, BEATREME 2608F, a Sauterne wine powder, and for making red wine, BEATREME 2608G, a Burgundy wine powder. Both products are available from Beatrice Foods Co., Special Products Division, Chicago, Ill.

In a second preferred emboidment according to the invention, the composition and process are used to prepare a "hard cider" alcoholic beverage. In this embodiment it is preferred to include, among ingredients (ii), from about 5% to about 10% by weight, based upon the total weight of other ingredients of the composition, of apple juice powder. Such apple juice powder is the solids obtained by the spray drying or freeze drying of apple juice. A suitable apple juice powder is available commercially as such, from Beatrice Foods Co., Special Products Division, Chicago, Ill.

It is also preferred to include with the ingredients a granular artificial fruit flavoring ingredient, to confer the desired flavor on the resulting beverage, both when making wine and when making cider. A particularly preferred such ingredient is a dried granulated apple flavored ingredient, in the amount of from about 3 to about 5 parts by weight, such as that supplied by Firmenich of Canada under designation 51.739/AP.0551. Artificial flavorings are included in combination (ii) of the mixture according to the invention.

The preferred organic acid for use according to the invention is malic acid, since this gives a flavor to the final beverage most closely approximating the desired flavor. As a yeast, a cultured Montrechey wine yeast strain is preferred. In the absence of any coloring matter, the beverage so formed will be a white beverage, e.g. a white wine. In order to make a red wine, standard red food dyes can be added, for example red food dye No. 2 in Canada and red food dye No. 40 in the United States.

It will be appreciated that all of the ingredients according to the invention are dry, solid, granular materials. They can be stored indefinitely without significant risk of their deterioration. They can be prepared and blended in the correct proportion at the factory, packaged together in suitable amounts for the preparation of a given quantity of beverage, and sold in such prepackaged form, along with simple instructions for the consumer to follow.

In accordance with the present invention, beverages having alcoholic contents in the 12–16% by volume range can readily be obtained, in a period of about 28 days. Normally, the products show good clarity, and are remarkably stable even after exposure to atmosphere. In contrast with many regular wines, the beverages according to the invention, after storage under atmospheric exposure, show no sign of development of wild yeast flora. The reason why the ingredients according to the present invention will yield such good clear beverages with alcoholic contents in the 14% by volume range, after only about 28 days fermentation, is not fully understood. The ingredients (i) which are pretreated with water and dried are generally known as useful yeast nutrients, particularly for promoting the growth and multiplication of the yeast cells during the primary fermentation stages. It is believed that the pretreatment of these ingredients with water, followed by drying and granulation (i.e. screening) thereof, in some way enhances their yeast-nutrient effectiveness. However, all of the other ingredients in the composition according to the invention appear to have some role to play in the rapid fermentation to produce a wine-like, clear beverage of relatively high alcoholic content. For example the palatable organic acid such as malic acid is used in relatively large quantities to give a desirable flavor to the final beverage. Such large quantities of acid, however, tend to give non-optimum fermentation conditions, and so chalk (calcium-carbonate) is used to reduce acidity whilst not interfering with the flavor conferring action of the malic acid.

It is preferred to sell the composition according to the invention prepackaged in suitable amounts for making one gallon of wine or cider. Suitably, such amounts of ingredients total about 2 ounces in weight. These should be mixed with about 2½ pounds (5 cups) of ordinary granulated sugar (surcrose) and water to make one gallon in a narrow necked, one gallon container. The top of the container is substantially closed by means of a plastic film e.g. of polyvinylidene chloride, which satisfactorily adheres to the neck and top of the container, the film being provided with a pin hole aperture opposite the opening to the container, so as to permit escape of carbon dioxide evolved during fermentation. After the 28 day period, the beverage is carefully poured off the sediment. It is normally clear at this stage. If a sweeter beverage is required, further sugar can be added at this stage, without significant risk of renewed fermentation.

The composition and process of the invention is further illustrated in the following non-limitative examples.

EXAMPLE 1

One Imperial gallon (160 fluid ounces) of a white wine-like alcoholic beverage was made according to the invention as follows.

A dry mixture of 4 parts by weight ammonium phosphate, 4 parts by weight urea, 2.5 parts by weight monobasic potassium phosphate and 1 part by weight tricalcium phosphate was prepared by dry mixing, and sufficient water was added to the mixture to make a paste, which was semi-solid and non-flowing. This paste-like slurry was then allowed to dry, and the solid material was granulated and screened, so as to recover it in a granular, crystal form.

The mixture so formed from the dried paste was next mixed with about 20 times its own weight of a mixture of 4 parts by weight of food grade lecithin, 6 parts by weight of calcium carbonate (precipitated chalk), 12 parts by weight of a dry Montrechey cultured wine yeast, 22 parts by weight of sodium citrate, 66 parts by weight of malic acid and 4 parts of weight of apple flavoring designation 51.739/AP.0551. The mixing took place in a ribbon blender, to obtain a thorough, intimate admixture of ingredients, in the dry form. This resulted in a composition having the following exact formulation:

malic acid—1.07582 ounces
sodium citrate—0.38422 ounces
yeast—0.21773 ounces
chalk—0.10246 ounces
apple flavoring (dried powder)—0.06404 ounces
lecithin—0.06404 ounces
ammonium phosphate—0.03074 ounces
urea—0.03074 ounces
monobasic potassium phosphate—0.01921 ounces
tricalcium phosphate—0.00768 ounces
potassium metabisulphite—0.00320 ounces The potassium metabisulphite is added for sterilizing purposes, since, as is known, it releases sulphur dioxide which effectively kills wild yeast strains but leaves unharmed the cultured wine yeast strain.

Two and one half pounds of white granulated sugar (sucrose) was dissolved in 5 cups of hot water, in a large mixing bowl with continuous stirring. Five cups of cold water was then added to the mixture, and then the composition described above was added to the solution. After mixing, the entire solution was emptied into a one gallon Imperial jug, which was then filled to within 2 inches of its mouth with cold tap water. The mouth of the jug was covered with plastic Saran wrap, firmly fastened down, and a pin hole was punched in the cover of the jug. The jug containing the solution was stored in a warm place at a temperature of from 70°–80°, away from direct sunlight, for 28 days, during which time fermentation proceeded, as evidenced by visual observation of the container.

After 28 days, the supernatant liquid was carefully poured from the gallon jug into a separate container, and the sediment was discarded. On tasting, the liquor had the characteristics of a dry table wine.

Subsequent chemical analysis of the wine-like beverage so formed, conducted by the Ontario Department of Agriculture, Wine Testing Station, Vineland, Ontario, gave the following result:

alcohol, percent by volume—14.1
° brix approximate percent sugar——0.9
total acid, gm. per 100 ml.—0.87
volatile acid, gm. per 100 ml. as acetic—0.042 pH, hydrogen iron concentration—3.45

The expert tester commented that the beverage had a clean, fruity almost "synthetic" odor and taste. The alcohol was reported as high for a table wine.

In some cases, it is found on tasting after 28 days fermentation that the wine is dry and/or bitter. At this point, sugar can be added to suit the consumer's taste. If the flavor of yeast remains after sweetening, or even before sweetening, this can be substantially removed by vigorous stirring, e.g. with a domestic egg beater.

EXAMPLE 2

The procedure of Example 1 was repeated, with the exception that there was additionally added to the composition of ingredients, prior to fermentation, a very small amount of Red Food Dye No. 40 and 0.16 ounce of Burgundy Wine Powder Beatreme 2608F from Beatrice Food Co. The product is reported to contain dextrin and Burgundy wine solids, and is produced by either spray drying or freeze drying of an appropriate wine, so as to dehydrate and de-alcoholize it.

The composition was mixed with sucrose and water, in the amounts given for Example 1, and fermented by the procedure described in Example 1. After about 28 days, it yielded a red wine beverage of good clarity, and alcohol content about 14% by volume.

EXAMPLE 3

The procedure of Example 1 was repeated, with the exception that there was additionally added to the composition of ingredients listed, prior to fermentation, 0.16 ounce of Apple Juice Powder, obtained from Beatrice Foods Co. The composition was mixed with the same amounts of water and sucrose given in Example 1, and fermented by the same procedure and under the same conditions, for about 28 days. There was produced a clear, hard cider beverage of alcohol content about 12% by volume.

It will be appreciated that the above description and exemplification is for illustration purposes, and is not to be considered as limiting. The scope of the invention is limited only by the appended claims.

I claim:

1. A composition of matter suitable for preparing an alcoholic beverage or mixing with fermentable sugar and water and fermenting, said composition comprising:
    (i) the dried granular product obtained by mixing with water to form a semi-solid, non-flowing paste a yeast nutrient combination comprising from about 3 to about 5 parts by weight ammonium phosphate, from about 3 to about 5 parts by weight urea, from about 1.5 to about 3.5 parts by weight monobasic potassium phosphate, and from about 0.5 to about 1.5 parts by weight tricalcium phosphate, drying the paste and granulating the dried product so obtained; in admixture with (ii) a combination of flavor conferring and fermentation ingredients comprising from about 3 to about 5 parts by weight of food grade lecithin, from about 5 to about 7 parts by weight of calcium carbonate, from about 10 to about 15 parts by weight of wine yeast, from about 20 to about 25 parts by weight of sodium citrate, and from about 60 to about 75 parts by weight of a palatable organic acid selected from malic acid, succinic acid, tartaric acid and citric acid, the weight ratio of dried granular product (i) to ingredients combination (ii) being from about 1:16 to about 1:7.

2. The combination of claim 1 further including a dry granular artificial fruit flavoring ingredient as a component of combination (ii).

3. The composition of claim 2 wherein said artificial fruit flavoring ingredient is a dried granulated apple flavored ingredient, in the amount of from about 3 to about 5 parts by weight.

4. The composition of claim 3 wherein said palatable organic acid is malic acid.

5. The composition of claim 4 further including a dried wine powder in the amount of from about 5 to about 10 weight percent, based upon the total weight of the composition.

6. The composition of claim 5 also including a red food dye.

7. The composition of claim 4 further including a dried apple juice powder in the amount of from about 5 to about 10 weight percent, based upon the total weight of the composition.

8. A process of making an alcoholic beverage which comprises mixing together a composition according to claim 1, claim 5 or claim 7, fermentable sugar in the amount of from about 1900 to about 3200 parts by weight, and water in the amount of from about 8000 to about 12000 parts by weight, maintaining the mixture under fermentation promoting conditions and permitting fermentation to proceed for a period of from about 20-32 days, and separating the liquid from substantial amounts of sediment formed during fermentation.

* * * * *